United States Patent
Launiainen

(10) Patent No.: US 7,114,089 B2
(45) Date of Patent: Sep. 26, 2006

(54) SYSTEM FOR CONTROLLING OPERATION OF A PROCESSOR BASED ON INFORMATION CONTAINED WITHIN INSTRUCTION WORD

(75) Inventor: Aki Launiainen, Tampere (FI)

(73) Assignee: Nokia Corporation, Espoo (FI)

( * ) Notice: Subject to any disclaimer, the term of this patent is extended or adjusted under 35 U.S.C. 154(b) by 585 days.

(21) Appl. No.: 10/265,508

(22) Filed: Oct. 4, 2002

(65) Prior Publication Data

US 2003/0070105 A1  Apr. 10, 2003

(30) Foreign Application Priority Data

Oct. 5, 2001  (FI) ................... 20011947

(51) Int. Cl.
*G06F 1/26* (2006.01)
*G06F 15/76* (2006.01)

(52) U.S. Cl. ............... 713/323; 712/43; 712/229

(58) Field of Classification Search ............ None
See application file for complete search history.

(56) References Cited

U.S. PATENT DOCUMENTS

| | | | |
|---|---|---|---|
| 4,669,059 A * | 5/1987 | Little et al. ............. | 713/330 |
| 5,495,617 A | 2/1996 | Yamada | |
| 5,634,131 A | 5/1997 | Matter et al. | |
| 5,652,894 A * | 7/1997 | Hu et al. ............. | 713/322 |
| 5,655,124 A | 8/1997 | Lin | |
| 5,815,724 A | 9/1998 | Mates | |
| 5,825,674 A | 10/1998 | Jackson | |
| 5,996,083 A | 11/1999 | Gupta et al. | |
| 6,195,753 B1 | 2/2001 | Nakamura | |
| 6,219,796 B1 | 4/2001 | Bartley | |
| 6,477,654 B1 * | 11/2002 | Dean et al. ............. | 713/300 |
| 6,535,984 B1 * | 3/2003 | Hurd ................. | 713/320 |
| 6,671,815 B1 * | 12/2003 | Iwamura et al. ......... | 713/324 |
| 6,845,454 B1 * | 1/2005 | Kim ................. | 713/300 |
| 2004/0230852 A1 * | 11/2004 | Maher et al. .......... | 713/320 |

* cited by examiner

*Primary Examiner*—Thuan Du
(74) *Attorney, Agent, or Firm*—Ware, Fressola, Van Der Sluys & Adolphson LLP

(57) ABSTRACT

An instruction word is used to transfer information about whether the instruction word pertains to mode setting of a functional block. Instruction words included in the program code are processed in at least a first decoding step and a second decoding step, wherein in the first decoding step, said information included in the instruction word is examined. On the basis of the examination, it is determined whether the mode of one or more functional blocks is to be set or whether the second decoding step is to be taken, in which the instruction word is decoded to be run by one or more of said functional blocks. The invention also relates to a processor and an electronic device, in which the method can be implemented. The invention further relates to a program, in which a program code is provided for implementing the method.

17 Claims, 7 Drawing Sheets

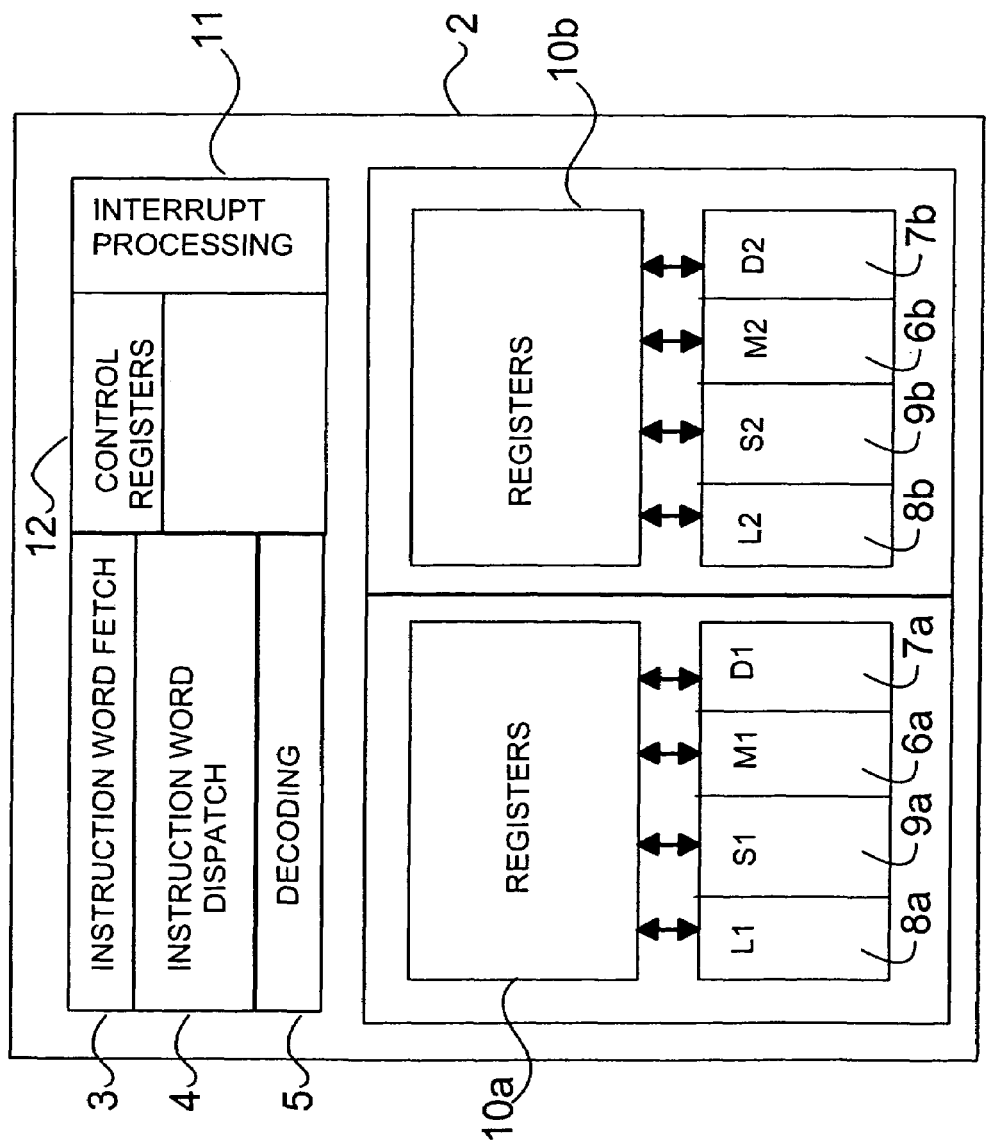

Fig. 6

```
FP      .set        A15
DP      .set        B14
SP      .set        B15
        .global     $bss .sect       ".text"
        .global     _ZeroMBlock8

;*******************************************************
;* FUNCTION NAME: _ZeroMBlock8                         *
;*******************************************************
_ZeroMBlock8:
||      MV      .L2X    A4, B4          ; output
||      SWFU                11011011    ; L1, S1, D1, D2, S2, L2 on and M1, M2 off (1)  ⟵——— 601
||      ZERO    .D1     A7              ;
||      ZERO    .D2     B7              ;
||      ZERO    .S1     A6              ;
        MVK     .S2     6, B0           ;

......

||      STDW    .D2     B7:B6, *B4++[2] ;
||      B       .S2     B3              ;
||      SWFU                00011000    ; D1, D2 on and L1, S1, M1, M2, S2, L2 off (2)  ⟵——— 602

||      STDW    .D1     A7:A6, *A4++[2] ;
||      STDW    .D2     B7:B6, *B4++[2] ;

||      STDW    .D1     A7:A6, *A4++[2] ;
||      STDW    .D2     B7:B6, *B4++[2] ;

||      STDW    .D1     A7:A6, *A4++[2] ;
||      STDW    .D2     B7:B6, *B4++[2] ;

||      STDW    .D1     A7:A6, *A4++[2] ;
||      STDW    .D2     B7:B6, *B4++[2] ;

||      STDW    .D1     A7:A6, *A4++[2] ;
||      STDW    .D2     B7:B6, *B4++[2] ;
||      SWFU                11111111    ; L1, S1, M1, D1, D2, M2, S2, L2 all on (1)     ⟵——— 603
        ; BRANCH OCCURS
```

SYSTEM FOR CONTROLLING OPERATION OF A PROCESSOR BASED ON INFORMATION CONTAINED WITHIN INSTRUCTION WORD

TECHNICAL FIELD OF THE INVENTION

The present invention relates to a method for controlling the operation of a processor, the processor comprising a core, two or more functional blocks, decoder arranged to decode instruction words contained in the program code, to be processed in one or more of said functional blocks, at least one of said functional blocks comprising at least two different modes, and the mode of at least one said functional block being set to one of said at least two modes at a time. The invention also relates to a processor comprising a core, one or more functional blocks, decoder arranged to decode instruction words contained in the program code, to be run in one or more of said functional blocks, at least one of said functional blocks comprising at least two different modes, and mode setter arranged to set the mode of at least one of said functional blocks to one of said at least two modes at a time. The invention also relates to an electronic device comprising a processor which comprises a core, one or more functional blocks, decoder arranged to decode instruction words contained in the program code, to be run in one or more of said functional blocks, at least one of said functional blocks comprising at least two different modes, and mode setter arranged to set the mode of at least one of said functional blocks to one of said at least two modes at a time. Moreover, the invention relates to a program for forming a program code, which program code comprises instruction words for controlling the operation of a processor, the processor comprising a core, one or more functional blocks, decoder arranged to decode instruction words contained in the program code, to be run in one or more of said functional blocks, at least one of said functional blocks comprising at least two different modes, and mode setter arranged to set the mode of at least one of said functional blocks to one of said at least two modes at a time.

BACKGROUND OF THE INVENTION

There are known processors which comprise one or more functional blocks in addition to a core. Such functional blocks may include, for example, a bus controller, an input/output interface, a direct memory access (DMA), a timer, etc. Furthermore, the processor core may include various functional components for instruction fetch, instruction decode, the management of processor registers, etc. In addition, the core may comprise one or more arithmetic logic units, multiplication units, divider units, floating point units, interrupt controllers, etc.

In program codes applied in conventional processors, one instruction word refers to the operation of one or more functional blocks, such as data retrieval from a memory toga register, starting of a timer, addition of two numbers, etc. Typically, the length of such instruction words is in the order of one to four bytes. Also, processors have been developed to apply very long instruction words, (VLIW), whose length may be several bytes. Thus, such a very long instruction word can be used for the transmission of an instruction even for each functional unit of the processor. The instruction word is thus divided into elements, in which each element contains an instruction for a given functional block. By means of such an arrangement, it is possible to accelerate the processing of program codes to some extent, because the number of steps to retrieve the instructions is reduced. The decoding of very long instructions can also be divided into parts, wherein each functional unit is provided with a separate decoder to perform the decoding of the instructions for this functional unit. Several decoders can thus decode parts of an instruction word substantially simultaneously.

The performance of processors has been continuously increasing. For example, the clock frequencies of processors have multiplied within a few recent years. However, the increase in the performance also causes problems, because the power consumption rises in proportion to the increase in the clock frequency. On the other hand, the power consumption can be reduced to some extent by reducing the operating voltage, as the power consumption is proportional to the square of the change in the operating voltage. Nevertheless, the operating voltage cannot be limitlessly reduced without affecting the reliability of operation and, on the other hand, the increase in the clock frequency sets its own limits to the reduction of the operating voltage.

Particularly, the increase in the power consumption causes problems in portable devices, in which the operating voltage is provided by batteries. The capacity of the batteries is limited, wherein it would be advantageous to adjust the power consumption according to the need of use. On the other hand, increased power consumption will also lead to increased warming-up, which causes problems in the arrangement of cooling and may also shorten the lifetime of the processor.

In some processors, the power control is implemented by monitoring the temperature and power consumption of the processor, wherein the operating voltage and/or the clock frequency are adjusted when necessary. Another solution applied for controlling the power consumption is based on setting some of the functional blocks of the processor in a power saving mode or turning them completely off at the stage when no operations are being processed in the functional block. Such techniques are based on the use of specific instruction words or flags. Thus, the program code is provided with either a program command to set the mode of a functional block as desired, or the instruction word is used to set a specific flag (bit or bit sequence) whose state will determine the mode of a given functional block. However, such methods have e.g. the problem that the decoding of the instruction words (e.g. Huffman decoding) must be performed normally also for those functional blocks which have been set in a power saving mode. The decoding of instruction words is very power-consuming, wherein such a solution is not advantageous for use in processors applying the architecture of very long instruction words. Furthermore, such a method cannot be used in such processor architectures in which the number of instructions in one instruction word is different from the number of functional units in the processor. It is obvious that said Huffman decoding is only an example of a decoding method but also other decoding methods are known which can be used in connection with processors.

In processors of prior art, the internal modes of functional blocks in the core cannot be set block by block but as a unit. Thus, if the core is set in a power-saving mode, the functional blocks of the core cannot be used, wherein e.g. the decoding of instructions will be stopped. Correspondingly, if the core is in the normal mode, also all the functional blocks of the core will be in the normal mode and will consume power, irrespective of whether they are used or not.

FIG. 1 shows, as a functional diagram, a decoding arrangement for instruction words used in a prior art processor e.g. for power saving. Each instruction word is provided with one or more flags which are used to control the power saving of the functional blocks in the processor. The instruction word prefetch block, fetches 101 the instruction word 102 to be performed next and transfers one or more flags 103 for controlling e.g. power saving to a decoder for their interpretation. The decoder transfers 104 the interpretation data to control registers, of which each sets 105, in a corresponding manner, the mode of a given functional block to a power saving mode or to the normal mode according to the value of the flag in the instruction word. In the processor according to this arrangement, instruction words must be decoded all the time so that the power saving flags can be interpreted.

SUMMARY OF THE INVENTION

It is an aim of the present invention to provide an improved method for controlling the power of the processor, as well as a processor in which power control can be performed more efficiently than in processors of prior art. The invention is based on the idea of determining a specific instruction word for setting the mode, such as a power saving instruction word, to control the settings of the modes in the operational elements of the processor. This power saving instruction word is preferably decoded by a separate decoder substantially immediately after the step of fetching the instruction word. In this way, instructions are decoded and transferred to only such functional blocks which are in the normal mode. To put it more precisely, the method according to the present invention is primarily characterized in that the instruction word is used for transmitting information about whether it is an instruction word relating to the setting of a mode, and that instruction words included in the program code are processed in at least a first decoding step and a second decoding step, wherein in the first decoding step, said information attached to the instruction is examined, and after the examination, it is determined whether one or more of said functional blocks are to be set in a mode or whether the second decoding step is to be taken, to decode the instruction word to be run by one or more of said functional blocks. The processor according to the present invention is primarily characterized in that the instruction word is provided with information about whether it is an instruction word relating to the setting of a mode, that the decoder comprise at least a first decoding block and one or more second decoding blocks, and that the first decoding block comprises detector arranged to examine said information included in the instruction word, wherein the processor comprises first transmitter means arranged to transfer the instruction word to said mode setter, if the instruction word is related to the setting of a mode, and second transmitter arranged to transfer an instruction word other than one relating to the setting of a mode, to be decoded in said one or more second decoding blocks. The electronic device according to the present invention is primarily characterized in that the instruction word is provided with information about whether it is an instruction word relating to the setting of a mode, that the decoder comprise at least a first decoding block and one or more second decoding blocks, and that the first decoding block comprises detector arranged to examine said information included in the instruction word, wherein the processor comprises first transmitter arranged to transfer the instruction word to said mode setter, if the instruction word is related to the setting of a mode, and second transmitter arranged to transfer an instruction word other than one relating to the setting of a mode, to be decoded in said one or more second decoding blocks. The program for forming a program code according to the present invention is primarily characterized in that the program for forming the program code is provided with a function for setting information, at least in an instruction word related to the setting of a mode, to indicate whether the instruction word relates to the setting of a mode, wherein instructions words included in the program code are processed in at least a first decoding step and a second decoding step, wherein in the first decoding step, said information related to the instruction word is examined, and on the basis of the examination, it is determined whether the setting of the mode of one or more of said functional blocks is to be performed or whether the second decoding step is to be taken, in which the instruction word is decoded to be performed by one or more of said functional blocks.

The present invention shows remarkable advantages over solutions of prior art. In the processor according to the invention, it is possible to achieve more versatile power saving solutions, because the modes of units included in the core of the process can also be set individually. Moreover, the power control logic can be simplified, because the power saving operations are defined in the program code. Further, any means for measuring the temperature and power consumption of the processor will not be necessarily needed in the processor of the invention. When applying the method of the invention, it will not be necessary to decode instruction words in such functional blocks which have been set in a power saving mode. Also, the instruction word decoder in such a functional block can be set in a power saving model. Thus, the power consumption can be significantly reduced. In particular, the reduced power consumption will prolong the operating time of portable devices and decrease the warming-up of the devices. Thus, it will not be necessary to take into account any particular cooling arrangements in the design of the device, which will also reduce the costs on the design and the manufacture. In some applications, the reduced need of power may make it possible to reduce the size of the batteries. Thus, the size of the device may be reduced as well.

DESCRIPTION OF THE DRAWINGS

In the following, the invention will be described in more detail with reference to the appended drawings, in which FIG. 3*b*, shows the structure of a processor according to a preferred embodiment of the invention in a reduced block chart, FIG. 6 is a reduced block chart illustrating the structure of the core in a processor according to a preferred embodiment of the invention from the point of view of power saving functions.

DETAILED DESCRIPTION OF THE INVENTION

In the following description of the invention, processor for very long instruction words will be used as an example of the processor 1, but it will be obvious that the invention is not limited to such processors only.

Figure 3A:
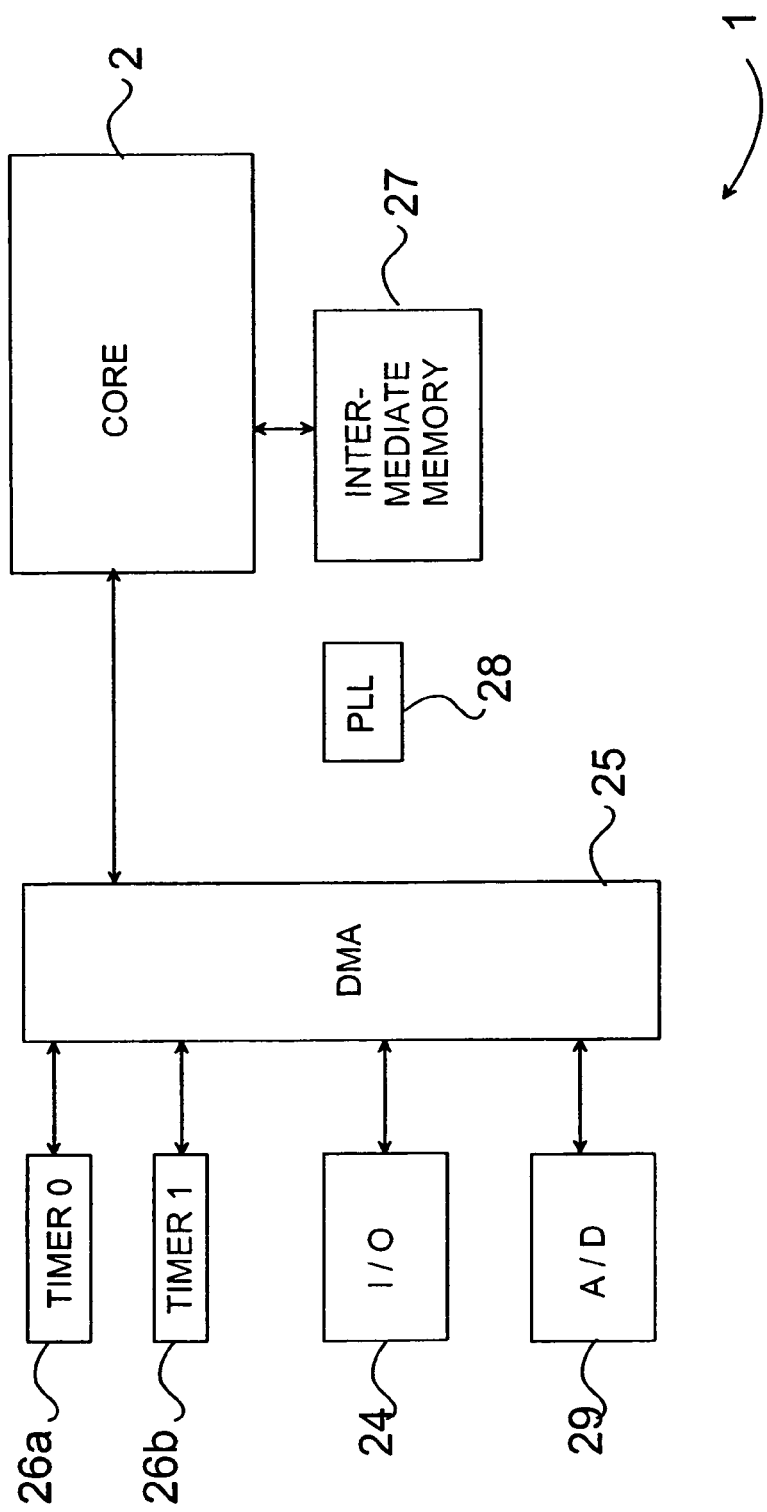
FIG. 3*a* shows the structure of a processor according to a preferred embodiment of the invention in a reduced block chart.

FIG. 3a is a reduced block chart illustrating the structure of the processor 1 according to an advantageous embodiment of the invention, and FIG. 3b shows the structure of the core 2 of the processor according to FIG. 3a. The processor 1 comprises, for example, interface means 24, a memory address unit 25, timers 26a, 26b, a cache memory 27, a clock circuit 28, such as a phase locked loop (PLL), and an analog-to-digital converter 29. Furthermore, the processor comprises a core 2 which contains, for the processing of instruction words, e.g. a prefetch block 3, a decoding block 5 and a dispatch block 4. In this advantageous embodiment, the core 2 comprises two groups of functional units, A and B, each comprising a multiplication unit (M1, M2) 6a, 6b, a data addressing unit (D1, D2) 7a, 7b, as well as two arithmetic logical units (L1, L2, S1, S2) 8a, 8b, 9a, 9b. Furthermore, each group of functional units A, B contains registers 10a, 10b which are available to the functional units of said group. Also, the core 2 contains e.g. an interrupt controller 11 as well as control registers 12. The internal structure of the core is illustrated in a reduced manner in FIG. 3b.

Figure 4:
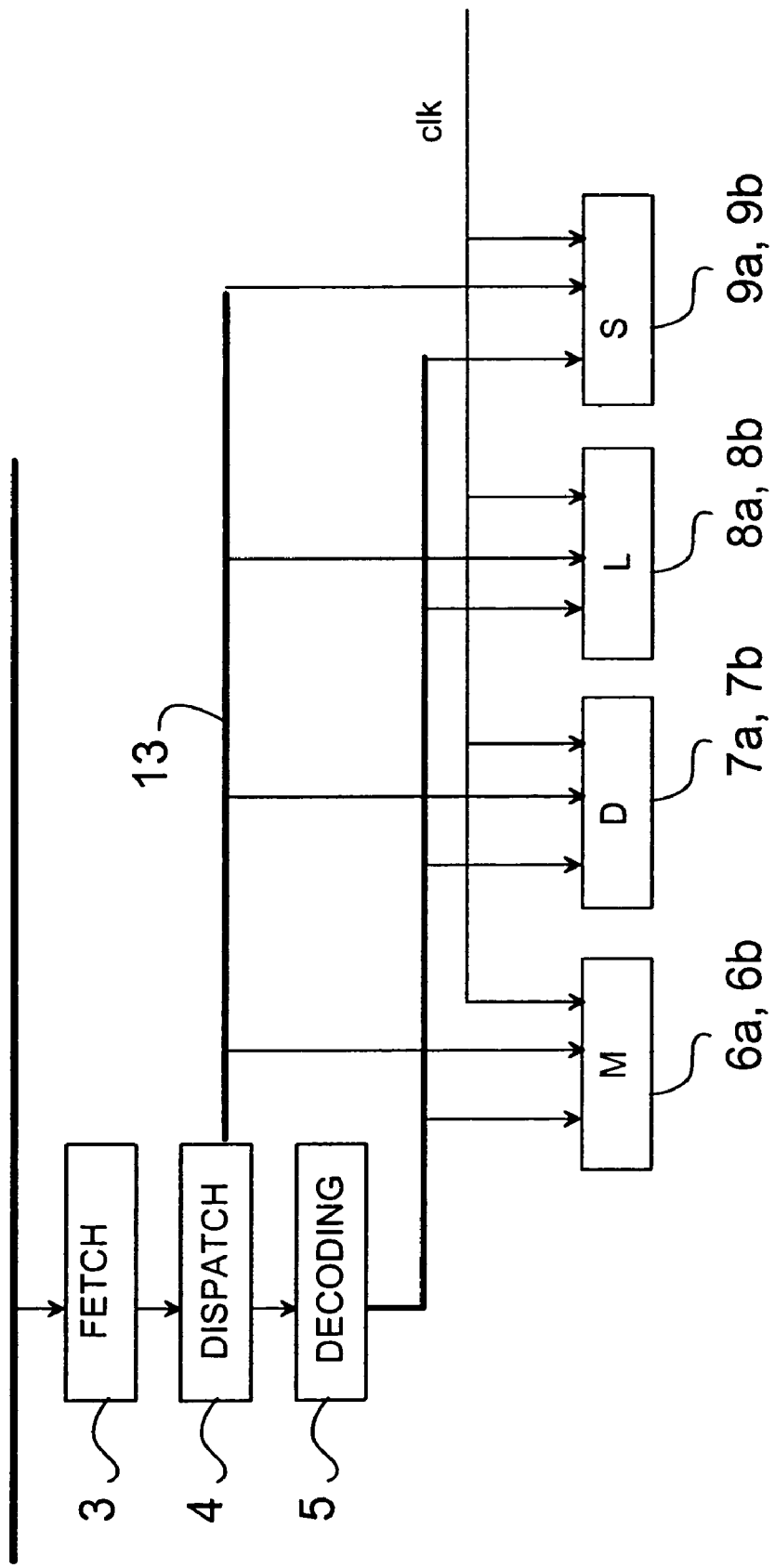
FIG. 4 is a reduced block chart illustrating the structure of the core in a processor according to a preferred embodiment of the invention from the point of view of power saving functions.

FIG. 4 is a reduced block chart illustrating the part of the core 2 in a processor according to a preferred embodiment of the invention from the point of view of power saving functions. For the power saving functions, the core 2 of the processor is provided with a mode setting bus 13 which can be used to set the mode of each functional unit 6a–9a; 6b–9b of the core 2 in the processor to one of at least two different modes. In this embodiment, the mode setting bus 13 preferably comprises one or more mode setting lines for each functional unit. The number of the mode setting lines is affected, for example, by the number of possible modes for each unit. For example, if there are two modes, one setting line will be sufficient for each unit. In general, it can be stated that the number of mode setting lines is preferably n, when the number of selectable modes ranges from $2^{n-1}$ to $2^n$. The state of the mode setting lines is determined in the decoding block 5 on the basis of information included in a specific mode setting instruction word, as will be presented below in this description. Furthermore, it should be mentioned that the order of the decoding block 5 and the dispatch block 4 may also be different from that shown in FIG. 4.

Figure 1:
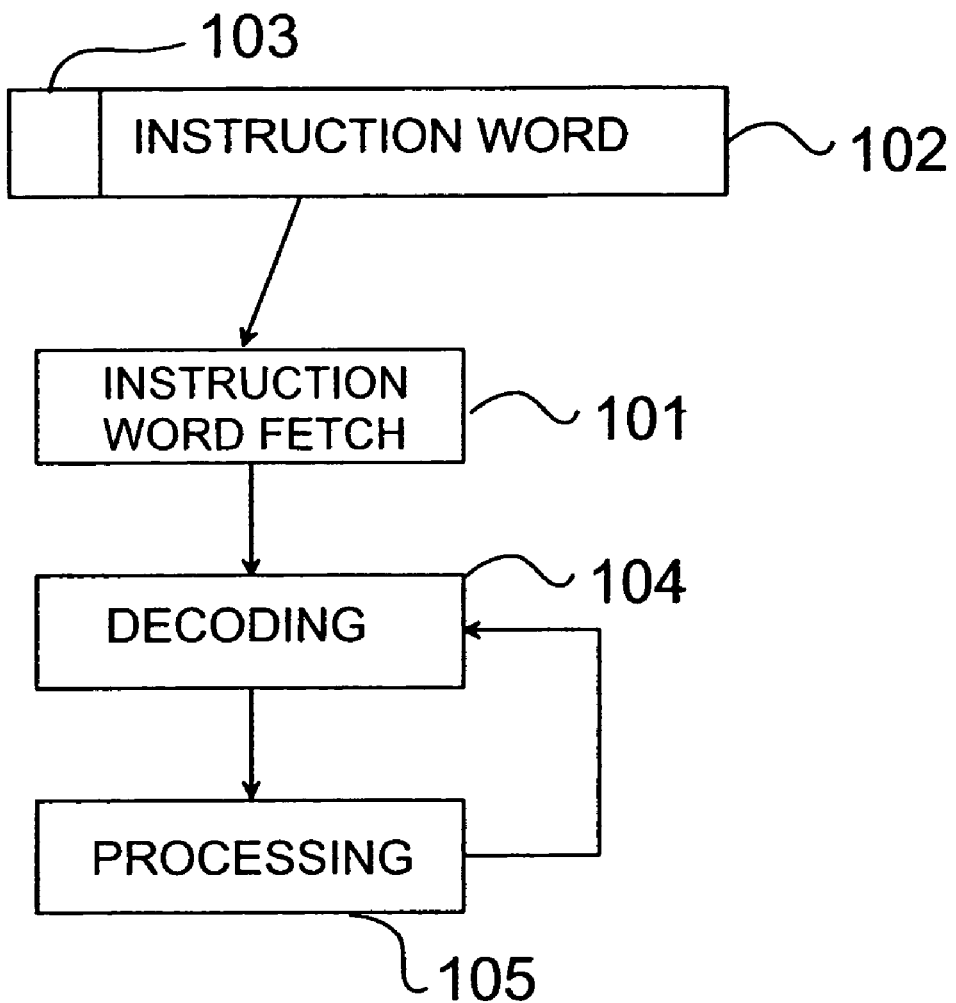
FIG. 1 illustrates, in a functional diagram, the power control of a processor of prior art.
Figure 2:
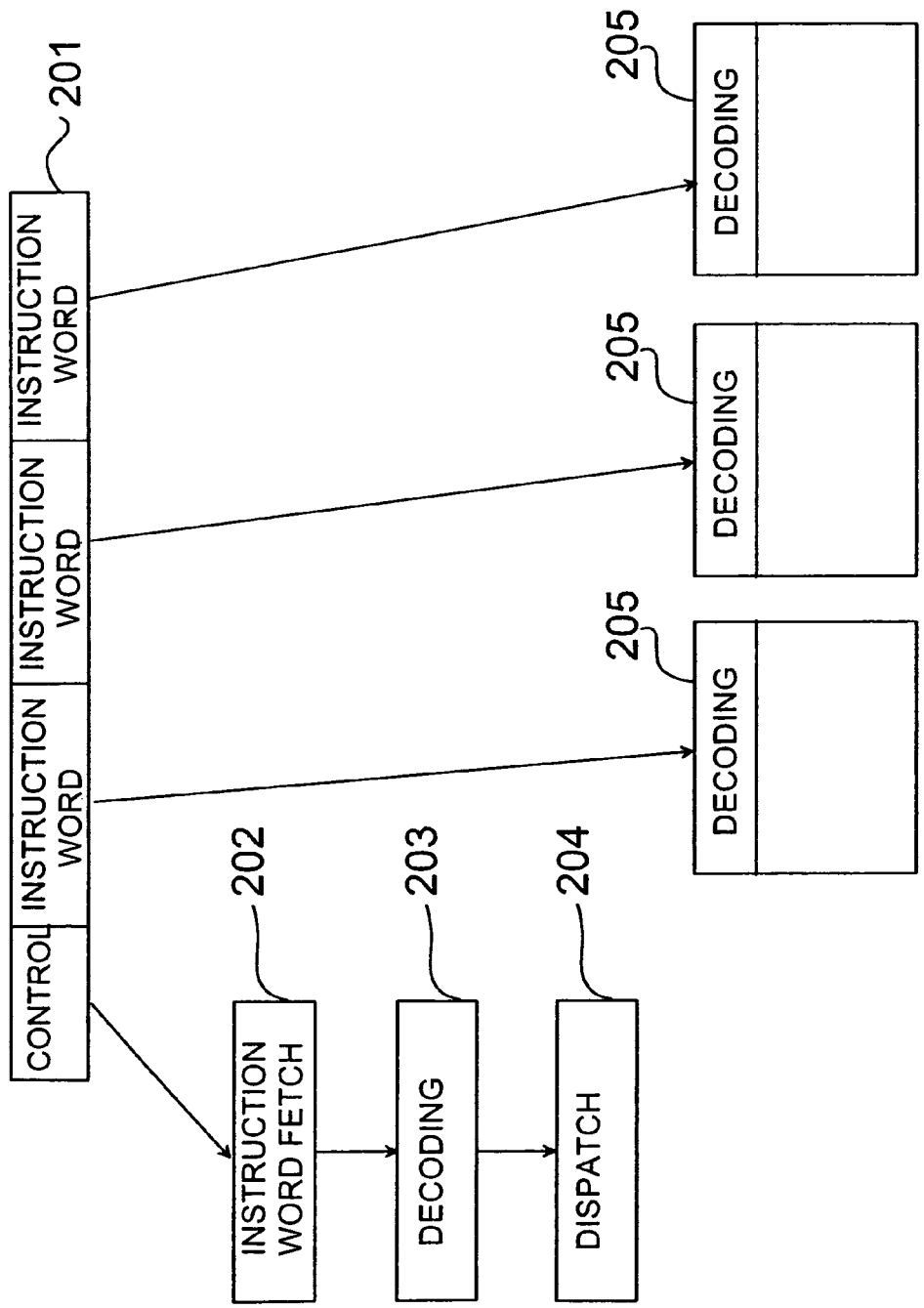
FIG. 2 is a functional diagram illustrating the decoding of instruction words in a processor according to an advantageous embodiment of the invention.
Figure 5:
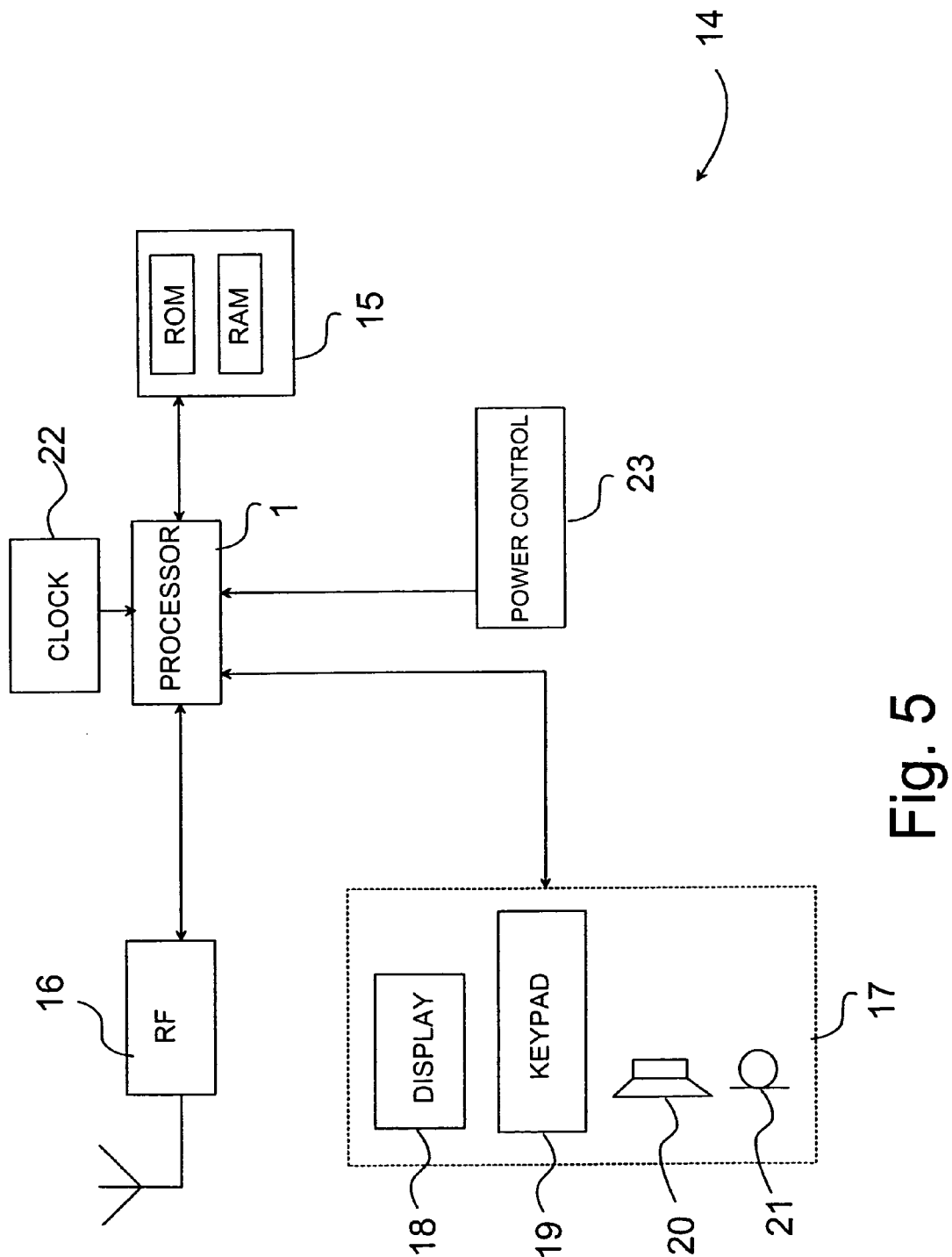
FIG. 5 shows an electronic device in which the processor according to a preferred embodiment of the invention can be used.

In the following, we will discuss the operation of the method according to a preferred embodiment of the invention in the processor 1 of the electronic device 14 of FIG. 5 with reference to the diagram of FIG. 2. The electronic device 14 may be any electronic device with at least one processor 1. Some non-restrictive examples to be mentioned include portable electronic devices, such as laptop computers, wireless communication devices, and wireless terminals. In this example, the electronic device 14 is a wireless terminal which comprises e.g. data processing functions and mobile communication functions. The program code of the processor, including instruction words 201 for running different operations, is stored in memory means 15. The memory means preferably comprise a read-only memory (ROM) and a random access memory (RAM). In connection with the invention, it is possible to apply a number of various read-only memories and random access memories which are known to anyone skilled in the art, wherein it will not be necessary to discuss them in more detail in this context. For the mobile station functions, the electronic device 14 is provided with e.g. a transceiver block 16. For the use of the electronic device 14, one or more user interfaces 17 are provided, preferably comprising a display 18, a keypad 19, an earpiece/speaker 20, and a microphone 21. A clock 22 is used to generate clock signals which are necessary particularly for the operation of the processor 1. Also, if necessary, the power saving circuit 23 can control the clock frequency by a method of prior art.

During the use of the electronic device 14, the prefetch block 3 of the processor 1 fetches 202 instruction words 201 from the memory means 15. Depending on the length of the instruction word, the fetching is performed in one or more steps. After this, the fetched instruction word is preferably transferred to the decoding block 5 to be decoded 203. In the decoding block 5, the instruction word is determined. The instruction word is preferably provided with information about whether it is an instruction word related to mode setting or another instruction word. This type data, for which decoding is performed in the decoding block 5, is, for example, one or more bits in the instruction word. Thus, the type data is examined first, and if it indicates an instruction word related to mode setting, the necessary steps are taken to set the mode. Thus, the instruction word will not be transferred to the decoding block 205 of the functional blocks, which decoding blocks can thus be turned off or set in a power saving mode, if necessary. If the instruction word is another one than one related to mode setting, the instruction word is processed by transferring the parts of the instruction word to the decoding blocks 205 in those functional units, for which instructions and/or parameters are intended in the instruction word in question. The instruction word may also comprise parameters or other information which is thus separated from the instruction word itself. It is assumed that the fetched instruction word is a mode setting instruction word which preferably comprises information about the mode to be set for each such functional block in the core 2 of the processor, for which at least two different modes can be selected. In the example of FIG. 4, it is assumed that said units 6a–9a; 6b–9b of the groups A, B of the functional units include the possibility to select at least the normal mode and a power saving mode (unenergized mode, standby mode, turned off). The mode setting instruction word is divided into parts so that a given part is allocated for information to indicate the mode of a given unit. Thus, the decoding block 5 will examine each part and set the mode setting line of the unit corresponding to this part to such a value by which the mode of the unit is set correct. For example, in an application in which the modes are the normal mode and the turned off mode, the value of the setting line will determine whether the operating voltage is to be coupled to the unit or not. Also other possible implementation alternatives may be applied to set the different modes. Also, the mode setting instruction word may be implemented in such a way that it contains information about the units by which the mode is to be changed and, if necessary, also information about the new mode of this unit. Naturally, if there are only two modes, it will be sufficient to inform whether the mode is to be changed or not.

The decoding block 5 preferably stores information about the mode of each unit. Thus, when decoding the next instruction words, the decoding block 5 may determine which units are in the normal mode and may decode parts of instruction words intended for such units only. By this solution, it is thus also possible to avoid the decoding of empty operands (no operation, NOP).

After the decoding step in this embodiment, the dispatch block 4 will transmit 204 the parts of instruction words corresponding to each unit to such units which are in the normal mode. Each unit is preferably provided with a separate decoding block 205 for decoding the instruction word of this unit and for performing the operations required by the instruction word.

Instruction words to be decoded and processed will not be transferred to such functional blocks which have been set in the power saving mode. This can be implemented in a variety of ways. Particularly in systems, in which the instruction words have a fixed length and comprise a given element allocated for a given functional block, the decoding block 5 and/or in the dispatch block 4 will prevent the transfer of the instruction word element to such a functional block which has been set to a power saving mode. Another alternative is that such instruction word elements are not formed in the program code at the stage of forming the program code. This alternative is suitable, for example, for such systems in which the length of the instruction words may vary and/or in which not all instruction words comprise a given element allocated for a given functional block. Thus, the length of the program code can also be reduced, because unnecessary instruction word elements, will not be included in the program code. Naturally, both of the above-presented methods can also be applied in combination.

As already stated above, the order of the decoding block 5 and the dispatch block 4 may be changed, wherein the elements of the instruction word are first dispatched to different units. After this the instructions are decoded for those units which are in the normal mode. However, the decoding of the mode setting instruction and the setting of modes are performed centrally in the decoding block 5.

In pipeline architectures, previously fetched instruction words may be under processing or waiting for processing when the power saving instruction word is being processed in the decoding block 5. In such practical applications, the mode can be changed, for example, by changing the mode substantially immediately in all those functional blocks whose mode is to be changed by an instruction related to mode setting. In this case, the running of possible instructions under processing is interrupted, and unprocessed instructions which are waiting will not be run. Another alternative is to change the mode gradually after the instructions being processed and waiting for being processed have been run.

FIG. 6 shows an example listing of some parts of a program code, in which e.g. the modes of units in the core 2 of the processor are being set. For example, reference numeral 601 indicates an instruction word, in which the multiplication units 6a, 6b of the first A and second groups B are set in the power saving mode, and the data addressing unit 7a, 7b, as well as the arithmetic logical units 8a, 8b, 9a, 9b are kept in the normal mode. In a corresponding manner, the instruction word 602 is used to set the multiplication units 6a, 6b of the first A and second groups B, the data addressing unit 7a, 7b, as well as the arithmetic logical units 8a, 8b, 9a, 9b in the power saving mode, and the data addressing unit 7a, 7b is kept in the normal mode. Furthermore, the instruction word 603 is used to set the, multiplication units 6a, 6b of the first A and second groups B, the data addressing block 7a, 7b, the arithmetic logical units 8a, 8b, 9a, 9b, as well as the data addressing unit 7a, 7b in the normal mode.

The mode setting instruction words can be placed relatively freely in the program code. In the placement, however, one should consider how fast each unit can change its mode. Thus, in some situations, it may be more advantageous to leave a unit in the normal mode than to set it in the power saving mode for a short time. On the other hand, the processor 1 may be provided with one or more such modes in which the power consumption is higher than when the unit is turned off but lower than in the normal mode and in which the functional unit can be set quickly. Thus, such a mode can be used in a situation in which there is, for example, no time to deactivate and reactivate the unit.

The mode setting instruction words can be placed in the program code, for example, by creating the program code using a higher level programming language (C++, Pascal, Fortran, etc.) without power saving instruction words and by compiling the program code with a compiler to a hardware compatible program code (assembler code). Then, by examining this program code, it is possible to find out which units are active each time and which units are not running any operations. Thus, mode setting instruction words can be added in suitable locations in the hardware compatible program code, for example, by an editing program. It is also possible to add the mode setting instruction words at the compiling stage already, wherein the compiler includes functions by which the compiler analyses the activity of the units in different parts of the program code. Thus, on the basis of the analysis, the compiler will add mode setting instruction words in suitable parts of the compiled program code.

The hardware compatible program code must still be compiled to a machine language program code before it can be run in the processor 1. Normally, the software formed in the electronic device 14 consists of several separate program code modules which are each compiled to machine language modules. These modules are combined (linked) to one machine language program code which can be stored in the memory means 15 of the electronic device. The memory means 15 may contain several such program codes stored in a way known as such.

The invention is also suitable for use in such systems in which the program code is being interpreted during the operation of the processor. Thus, the device is equipped with interpreting means such as an interpreting program, a program implemented by a micro code or an interpreting block (not shown) in the processor, for interpreting and conversion (compiling) the instruction words included in the program code to program commands of the processor. Also, in such a system the above-presented principles can be largely applied in the processing of the instruction words. Such elements of the instruction word which are intended for functional blocks in the power saving mode can be either deleted at the stage of preparing or interpreting the program code, or are not transferred to be decoded. The interpreting block may be in connection with the processor or it may also be outside the processor.

Although it has been presented above that the mode setting instruction words are related to the mode setting of internal units in the core 2 of the processor, it is obvious that the method of the invention can also be applied in the mode setting of other internal functional blocks of the processor 2.

Because the mode setting instruction words are placed in the program code preferably before the running of the program code, the invention can be applied in such contexts, in which the order of running of the instructions of the program code is primarily known. However, it will be obvious that even in such programs, the running of the program is branched in a variety of ways in different situations, but these branchings can be anticipated on the basis of the program code, because the program code, as such, is not changed during the running of the program. The invention can be advantageously applied in such processors 1, in which the instruction word includes an instruction controlling the operation of at least two functional blocks or a unit in the core. One non-restricting example of such a processor is a processor applying the architecture of very long instruction words.

It should be evident that the present invention is not limited solely to the above-presented embodiments but it can be modified within the scope of the appended claims.

The invention claimed is:

1. A method for controlling the-operation of a processor, the processor comprising a core, two or more functional blocks, a decoder for decoding instruction words included in a program code to be run in one or more of said functional blocks, at least one of said functional blocks being provided with at least two different modes, and the mode of at least one of said functional blocks being set to one of said at least two modes at a time, the method comprising:
transmitting an instruction word containing information about whether it is an instruction word relating to setting of a mode, and
processing instruction words included in the program code in at least a first decoding in a first decoding block and a second decoding in a second decoding block,
wherein the first decoding comprises:
examining said information contained within the instruction word, and after the examination,
determining whether a mode of one or more of said functional blocks is to be set or whether the second decoding is to be taken;
wherein said second decoding comprises:
decoding the instruction word; and
executing the decoded instruction word by one or more of said functional blocks.

2. The method according to claim 1, comprising using a mode-setting instruction word in the program code to set the mode of the functional blocks of the processor.

3. The method according to claim 1, wherein to take the second decoding, the functional blocks are provided with means for decoding of the instruction word.

4. The method according to claim 3, wherein the means for the decoding of the instruction word, provided in connection with the functional units, are provided with at least a normal mode and a power saving mode, wherein if at the first decoding step, it is found that the instruction word pertains to mode setting, the method comprises setting said means for decoding of the instruction word in the power saving mode.

5. The method according to claim 1, wherein the instruction word relates to mode setting, and the method comprises transmitting information about the functional blocks whose mode setting said instruction word pertains to.

6. The method according to claim 5, wherein the mode setting is performed substantially immediately after the first decoding in all those functional blocks, to whose mode setting said instruction word relating to mode setting pertains.

7. The method according to claim 5, wherein if any one or more previously decoded instruction words is being processed in any functional block or waiting for being processed, the method comprises setting the mode of this functional block after all the previously decoded instruction words pertaining to this functional block have been run.

8. The method according to claim 1, comprising:
examining in the first decoding the mode of the second functional block to determine if the mode of the second functional block is a power saving mode, and
performing said second decoding only if it was determined that the second functional block is not in the power saving mode.

9. A processor comprising:
a core,
two or more functional blocks,
a decoder for decoding instruction words included in a program code, to be run in one or more of said functional blocks, at least one of said functional blocks being provided with at least two different modes, and
a mode setter for setting the mode of at least one of said functional blocks in one of said at least two modes at a time,
wherein the instruction word is provided with information about whether it is an instruction word relating to the setting of a mode, wherein the decoder comprises at least
a first decoding block comprising a detector arranged to examine said information contained in the instruction word; and
one or more second decoding blocks and wherein the processor comprises
a first transmitter for transferring the instruction word to said mode setter, if the instruction word pertains to the setting of a mode, and
a second transmitter for transferring an instruction word other than one pertaining to the setting of a mode, to be decoded in said one or more second decoding blocks.

10. Processor according to claim 9, wherein the mode setter sets the mode of the functional blocks on the basis of a mode setting instruction word placed in the program code.

11. The processor according to claim 9, wherein the second decoding block comprises a decoder for decoding the instruction word.

12. An electronic device comprising a processor, the processor comprises:
a core,
two or more functional blocks,
a decoder for decoding instruction words included in a program code, to be run in one or more of said functional blocks, at least one of said functional blocks being provided with at least two different modes, and
a mode setter for setting the mode of at least one of said functional blocks in one of said at least two modes at a time,
wherein the instruction word is provided with information about whether it is an instruction word pertaining to the setting of a mode, wherein the decoder comprises at least
a first decoding block comprising a detector for examining said information contained in the instruction word; and
one or more second decoding blocks, and wherein the processor comprises
a first transmitter for transmitting the instruction word to said mode setter, if the instruction word pertains to the setting of a mode, and
a second transmitter for transferring an instruction word other than one pertaining to the setting of a mode, to be decoded in said one or more second decoding blocks.

13. The electronic device according to claim 12, wherein the processor comprises a mode setter for setting the mode of the functional blocks on the basis of a mode setting instruction word placed in the program code.

14. A program for forming a program code, the program code comprises instruction words for controlling operation of a processor, the processor comprises:
- a core,
- two or more functional blocks,
- a decoder for decoding instruction words included in the program code, to be run in one or more of said functional blocks, at least one of said functional blocks being provided with at least two different modes, and
- a mode setter arranged to set the mode of at least one of said functional blocks in one of said at least two modes at a time, wherein the program for forming the program code is provided with a function for setting information, in at least an instruction word pertaining to setting of a mode, to indicate whether the instruction word pertains to the setting of a mode, wherein instructions words included in the program code are processed in at least a first decoding in a first decoding block and a second decoding in a second decoding block, and wherein in the first decoding, said information included in the instruction word is examined, and on the basis of the examination, it is determined whether the setting of the mode of one or more of said functional blocks is to be performed or whether the second decoding is to be taken, in which the instruction word is decoded to be run by one or more of said functional blocks.

15. The program according to claim 14, wherein it is provided with a function for inserting mode setting instruction words in the program code for setting the mode of the functional blocks of the processor in connection with the running of the program code.

16. The program according to claim 14, wherein said information is set in at least an instruction word related to mode setting at a stage of producing the program code.

17. The program according to claim 14, wherein the program code is interpreted at a stage of running of the program code, in which interpretation the program code is compiled to program commands of the processor, and wherein said data is set in at least an instruction word related to mode setting at the stage of interpretation of the program code.

* * * * *

UNITED STATES PATENT AND TRADEMARK OFFICE
CERTIFICATE OF CORRECTION

PATENT NO. : 7,114,089 B2
APPLICATION NO. : 10/265508
DATED : September 26, 2006
INVENTOR(S) : Launiainen Page 1 of 1

It is certified that error appears in the above-identified patent and that said Letters Patent is hereby corrected as shown below:

In column 1, line 13, claim 1, line 1, "the" should be deleted.

In column 9, line 49, claim 4, line 5, "step" should be deleted.

Signed and Sealed this

Sixth Day of March, 2007

JON W. DUDAS
*Director of the United States Patent and Trademark Office*